(12) United States Patent
Ganu et al.

(10) Patent No.: US 11,423,066 B2
(45) Date of Patent: Aug. 23, 2022

(54) SYSTEM AND METHOD FOR REDUCING USER QUERY AMBIGUITY THROUGH CHATBOT CLARIFYING QUESTIONS

(71) Applicant: Intuit Inc., Mountain View, CA (US)

(72) Inventors: Hrishikesh V. Ganu, Bangalore (IN); Viswa Datha P., Bangalore (IN)

(73) Assignee: Intuit Inc., Mountain View, CA (US)

( * ) Notice: Subject to any disclaimer, the term of this patent is extended or adjusted under 35 U.S.C. 154(b) by 392 days.

(21) Appl. No.: 16/568,704

(22) Filed: Sep. 12, 2019

(65) Prior Publication Data

US 2021/0081442 A1    Mar. 18, 2021

(51) Int. Cl.
  *G06F 16/33* (2019.01)
  *G06F 16/332* (2019.01)
  *G06F 16/335* (2019.01)
  *G06N 5/02* (2006.01)
  *H04L 51/02* (2022.01)

(52) U.S. Cl.
  CPC ........ *G06F 16/3326* (2019.01); *G06F 16/335* (2019.01); *G06F 16/3329* (2019.01); *G06F 16/3334* (2019.01); *G06N 5/02* (2013.01); *H04L 51/02* (2013.01)

(58) Field of Classification Search
  None
  See application file for complete search history.

(56) References Cited

U.S. PATENT DOCUMENTS

| 6,829,603 | B1 * | 12/2004 | Chai | ................... G06F 16/3344 707/999.005 |
| 10,803,248 | B1 | 10/2020 | Arfa et al. | |
| 10,958,599 | B1 * | 3/2021 | Penov | ................... G06F 16/285 |
| 11,086,857 | B1 | 8/2021 | Ganu et al. | |
| 11,170,026 | B1 | 11/2021 | Brown | |
| 2008/0275834 | A1 | 11/2008 | Zhong et al. | |
| 2014/0325254 | A1 | 10/2014 | Mani et al. | |
| 2016/0063097 | A1 * | 3/2016 | Brown | ................... G06F 16/358 707/737 |
| 2017/0177660 | A1 * | 6/2017 | Chang | ................. G06F 16/2425 |
| 2017/0337264 | A1 * | 11/2017 | Barbosa | ............... G06F 16/3329 |
| 2018/0032330 | A9 | 2/2018 | Ryall et al. | |
| 2018/0150552 | A1 | 5/2018 | Wang | |

(Continued)

FOREIGN PATENT DOCUMENTS

WO    2012024580 A1    2/2013

OTHER PUBLICATIONS

Bordawekar et al., "Using Word Embedding to Enable Semantic Queries in Relational Databases," DEEM '17, Chicago, IL, USA, 4-pages, May 12, 2017.

(Continued)

*Primary Examiner* — Son T Hoang
(74) *Attorney, Agent, or Firm* — Paradice and Li LLP

(57) ABSTRACT

Dialog systems, such as chatbots, enable a user to query for information of a data management system. However, a user's query may be ambiguous resulting in a reply of too much information that is incomprehensible to a user. Clarifying questions are posed to a user to remove ambiguity from a user's query, and based on a user's answers, the volume of replying information is reduced to an amount that a user can comprehend. Clarifying questions are efficiently sequenced to reduce the ambiguity of a user's query, such that the number of clarifying questions does not result in a user abandoning the user's query.

20 Claims, 6 Drawing Sheets

(56) References Cited

U.S. PATENT DOCUMENTS

| | | | |
|---|---|---|---|
| 2018/0240125 A1 | 8/2018 | Karuppasamy | |
| 2019/0114321 A1* | 4/2019 | Lam | G06F 16/2246 |
| 2019/0130415 A1 | 5/2019 | Cheah et al. | |
| 2019/0138660 A1* | 5/2019 | White | G06F 16/9038 |
| 2020/0065151 A1 | 2/2020 | Ghosh et al. | |
| 2021/0232948 A1* | 7/2021 | Otsuka | G06F 16/90335 |
| 2021/0349921 A1 | 11/2021 | Brown | |

OTHER PUBLICATIONS

Deng et al., "Advanced Search System for IT Support Services," IBM J. Res. & Dev., vol. 61, No. 1, Paper 3, pp. 3:27-3:40 (2017).
Zamani et al., "Embedding-Based Query Language Models," ICTIR '16, Newark, DE, USA, pp. 147-156, Sep. 12-16, 2016.
Zamani et al., "Relevance-Based Word Embedding," in proceedings of SIGIR '17, Aug. 7-11, 2017, Shinjuku, Tokyo, Japan, 10-pages.
Quarteroni, Silvia et al., "A Chatbot-Based Interactive Question Answering System," Decalog 2007: Proceedings of the $11^{th}$ Workshop on the Semantics and Pragmatics of Dialogue, pp. 83-90, Trento, Italy, May 30-Jun. 1, 2007.
Golovin, Daniel et al., "Adaptive Submodularity: Theory and Applications in Active Learning and Stochastic Optimization," Journal of Artificial Intelligence Research 42 (2011), pp. 427-486; Jan. 2011.
Yano, Yuki et al., "Quantifying Query Ambiguity with Topic Distributions," Proceedings of the $25^{th}$ ACM International Conference on Information and Knowledge Management, pp. 1877-1880; ACM, Oct. 24-28, 2016.
Zhou, Qi, et al., "SPARK: Adapting Keyword Query to Semantic Search," K. Aberer et al. (Eds.): ISWC/ASWC 2007, LNCS 4825, pp. 694-707, 2007.

\* cited by examiner

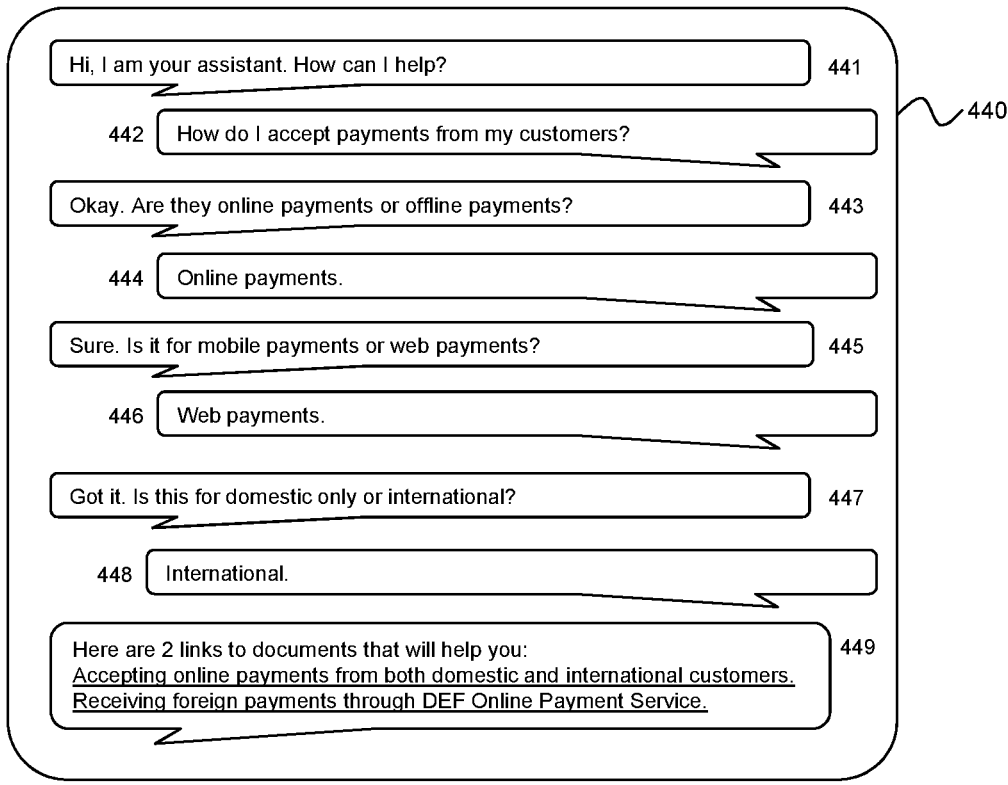

| 410 | 411 |
|---|---|
| 421 | Receive money through offline direct deposit |
| 422 | Receiving a cash payment & recording it in the system |
| 423 | How to receive check payments from your customers |
| 424 | Accepting online payments from customers using foreign currency |
| 425 | Easy way to integrate mobile payments for domestic transactions |
| 426 | Accepting payments on mobile through ABC Online Payment Service |
| 427 | Receiving foreign payments through DEF Online Payment Service |
| 428 | Accept domestic payments with GHI Online Payment Service |
| 429 | How to receive money on mobile through JKL Online Payment Service |
| 430 | Integrate online payments into your product for local payments |

| 510 | 511 | 512 | 513 |
|---|---|---|---|
| 521 | FIRST POSSIBLE QUESTION | | |
| 522 | 0.0001 | 3989 | 0.3989 |
| 523 | 0.9999 | 11 | 10.9989 |
| 524 | 1.0 | 4000 | 11.3978 |
| 525 | SECOND POSSIBLE QUESTION | | |
| 526 | 0.49 | 1000 | 490 |
| 527 | 0.51 | 3000 | 1530 |
| 528 | 1.0 | 4000 | 2020 |

| 610 | 611 |
|---|---|
| 621 | INPUT: Budget L, Set of possible questions E, Response Model R, Sequence of answers A |
| 622 | OUTPUT: Sequence of questions O = [$q_1$ ... $q_k$] for $q_i \in E$ |
| 623 | Function ArgmaxCoverage(E, R, A, O): |
| 624 |    return argmax $\Delta(q|Q_k)$ using R, A, E |
| 625 | O ← Φ |
| 626 | for i ← 1 to L do |
| 627 |    Select e* = ArgmaxCoverage(E, R, A, O) |
| 628 |    O ← append(O, e*) |
| 629 |    E ← remove(E, e*) |
| 630 |    A ← append(A, userAnswer(e*)) |
| 631 | end |

FIG. 6

SYSTEM AND METHOD FOR REDUCING USER QUERY AMBIGUITY THROUGH CHATBOT CLARIFYING QUESTIONS

BACKGROUND

A dialog system, which is commonly known as a chatbot, is typically used to interact with a user via text or voice conversations that imitate natural human conversations, behavior, and interactions. Some dialog systems provide a conversational user interface and act as a translator between a user and an application with which a user desires to interact, thereby allowing a user to use voice or text to interact with the application through the dialog system. For a dialog system processing voice data, automatic speech recognition (ASR) can be utilized to convert user speech or voice data to text. For processing text data, a dialog system can use natural language understanding (NLU) to recognize the meaning of the text data. In this way, the dialog system can provide an engaging user experience and a lifelike, or human-like, conversational interaction between the user and the application. Although traditional dialog systems are able to determine an intent of a user from the user's input voice or text data, the determined intent of the user may nevertheless be ambiguous.

Intent can be ambiguous even for conversations between humans. For example, a customer of an online store may call a customer service center and speak with a human agent about a recent online purchase. In this phone call, the human agent may comprehend the customer's words, but the intent of the customer may be ambiguous. In this example, the customer may say to the human agent, "My shipment did not get delivered." A typical human agent would understand these words of the customer, but would find the user's intent ambiguous. In this example, a human agent would look up the customer's account and may see that there are five shipments currently being delivered, but would not know to which shipment the customer is referring. Typically, a human agent would use intuition to ask clarifying questions of the customer in order to remove the ambiguity of the customer's intent. In this example, the human agent may ask for an order identifier or a date of the order to be able to ascertain to which shipment the customer is referring. Using such intuition, a human agent narrows down possible solutions by collecting additional contextual information until an adequate solution is available to be given to a customer.

In contrast, a traditional dialog system is not capable of using human intuition to remove ambiguity from a user's query. Instead, a traditional dialog system uses brute force to overcome ambiguity. A traditional dialog system may assume that a solution exists within a large quantity of choices, such as a million choices, and would work through each choice one at a time, often in a random pattern, until the solution is identified. However, a brute force methodology is limited because it can be time consuming for a user to be asked clarifying questions about each choice. Alternatively, traditional dialog systems rely on query popularity, in which historical chatbot conversations are utilized to attempt to remove ambiguity. Such a traditional dialog system would determine the most common queries from historical chatbot conversations and guess that the user is attempting to ask one of those most common queries. Such a traditional dialog system might use heuristics to automatically complete the user's query in hopes that the user's intent will match the most popular queries. However, such a traditional dialog system does not often achieve a reduction in ambiguity when a user has a query that is not one of the few common queries historically encountered by the traditional dialog system.

Consequently, there is a significant need for a technical solution to the long-standing technical problem of replying to ambiguous user queries of data management systems using dialog systems.

SUMMARY

As discussed in more detail below, embodiments of the present disclosure represent a technical solution to the technical problem of using automated dialog systems to reply to ambiguous user queries of data management systems. The technical solution to the technical problem of replying to ambiguous user queries of data management systems includes determining clarifying questions to clarify a query of a user within a chatbot conversation in order to provide the user with a limited number of documents from a knowledgebase of a data management system. If a user's query is determined to be ambiguous, clarifying questions are posed to the user to reduce the ambiguity. The determination of clarifying problems is modeled as an Adaptive Stochastic Maximization Problem with Cardinality Constraints (ASMC). A fast approximation algorithm under an adaptive submodularity framework is utilized with a strong optimality bound to reduce the ambiguity of a user's query. The iteration of clarifying questions to a user is reduced, which leads to an improved user experience.

BRIEF DESCRIPTION OF THE DRAWINGS

FIG. 4 is an example of a conversational user interface display for reduction of query ambiguity.

FIG. 5 is an example of maximum expected coverage for reduction of query ambiguity.

FIG. 6 is an example of an algorithm for reduction of query ambiguity.

Figure 1:
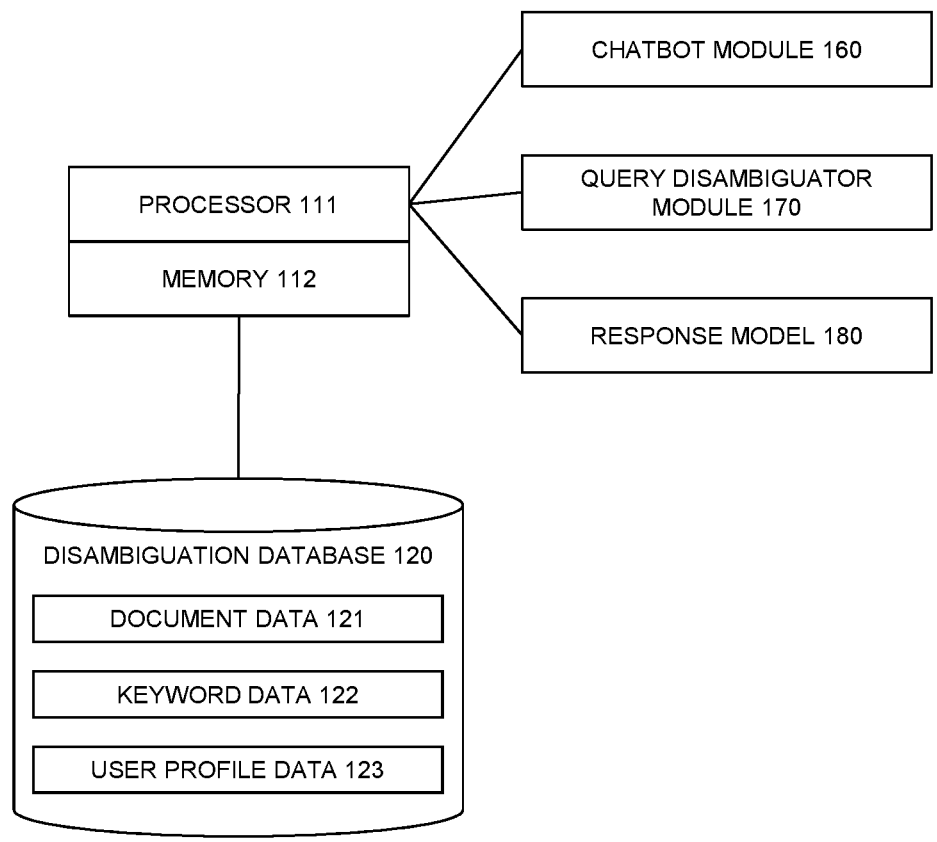
FIG. 1 is a query ambiguity reduction module for reduction of query ambiguity.

Common reference numerals are used throughout the figures and the detailed description to indicate like elements. One skilled in the art will readily recognize that the above figures are examples and that other architectures, modes of operation, orders of operation, elements, and functions can be provided and implemented without departing from the characteristics and features of the invention, as set forth in the claims.

DETAILED DESCRIPTION

Embodiments will now be discussed with reference to the accompanying figures, which depict one or more exemplary embodiments. Embodiments may be implemented in many different forms and should not be construed as limited to the embodiments set forth herein, shown in the figures, and/or described below. Rather, these exemplary embodiments are provided to allow a complete disclosure that conveys the principles of the invention, as set forth in the claims, to those of skill in the art.

Overview

FIG. 1 is a query ambiguity reduction module 100 for reduction of query ambiguity. The query ambiguity reduction module 100 includes a processor 111 and a memory 112. The memory 112 includes a disambiguation database 120 that stores document data 121, keyword data 122, and user profile data 123.

The memory 112 includes instructions stored therein and which, when executed by the processor 111, performs a process. The query ambiguity reduction module 100 includes instructions representing a chatbot module 160, a query disambiguator module 170, and a response model 180.

The chatbot module 160 can be a dialog system or a retrieval-based bot. The retrieval-based bot provides a user with self-help in a specialized domain. It is to be understood that the specialized domain includes accounting, personal finance, tax, legal, business management, medical, and other domains. The chatbot module 160 retrieves a set of valid domain documents applicable to a user's query. The chatbot module 160 delivers the set of valid domain documents to the user.

The document data 121 of the disambiguation database 120 represents documents organized as a knowledgebase. A document of the document data 121 provides solutions to queries of users. For example, a user query may be "What do I do when my banking data import is incorrect?" In this example, a document titled "Fix online banking errors" may include content that provides a solution to the user's query. A document contains information that is summarized by a title of the document.

The keyword data 122 of the disambiguation database 120 represents keywords that are extracted from the document data 121 to form an index of relationships between the keywords and matching documents. For example, a first document may have the title "Recurring credit card payments" and a second document may have the title "Process a credit card payment." In this example, both documents may relate to the keyword of "credit card." Accordingly, a clarifying question could be, "Is this a credit card payment?" A positive answer from the user would indicate that both the first and the second documents may be relevant to the user as a solution. A negative answer from the user would indicate that both the first and the second documents may be irrelevant to the user as a solution.

The query disambiguator module 170 reduces the ambiguity of ambiguous queries by posing a series of clarifying questions to the user. A query is considered ambiguous based on the number of documents that would be returned to the user, such as more than ten documents and any other number of documents. For example, a query from a user of "I want to learn more about the data management system" could potentially cause all of the data management system documents of the knowledgebase to be returned to the user, and thus the query would be considered ambiguous. The query disambiguator module 170 iterates through the series of clarifying questions such that with each iteration, the user's answer to the respective clarifying question invalidates some candidate documents. The query disambiguator module 170 reduces the set of valid documents after receiving an answer to a clarifying question. The number of valid documents is reduced to a threshold number that removes the ambiguity.

For example, a user may have a query of "I want to learn more about accounting." In this example, there may be 1,000 documents in the accounting domain, and 400 of those accounting documents are related to profit and loss statements and 600 of those accounting documents are related to balance sheet statements. In this example, 250 of those profit and loss statement documents are related to expenses and 150 of those profit and loss statement documents are related to income. In this example, eight of those income documents are related to payments with credit cards.

For example, the query disambiguator module 170 may determine that the user's query is ambiguous because 1,000 documents would be returned based on the "accounting" keyword, in which ambiguity is defined as exceeding ten documents. In this example, the query disambiguator module 170 may select a first clarifying question based on the keyword "profit and loss statements" and pose a question to the user of "Are you interested in profit and loss statements?" It is to be understood that in this example, the keyword of "profit and loss statements" is about information that was not provided in the user's query about accounting. In this example, if the user answers "yes," then the query disambiguator module 170 can remove the 600 balance sheet statement documents, leaving the 400 profit and loss statement documents. In this example, the query disambiguator module 170 determines that there is still ambiguity because 400 documents exceed the illustrative threshold of ten.

In this example, the query disambiguator module 170 may select a second clarifying question based on the keyword "expenses" and pose a question to the user of "Does this have to do with expenses?" In this example, if the user answers "no," then the query disambiguator module 170 can remove the 250 expense documents, leaving the 150 income documents. In this example, the query disambiguator module 170 determines that there is still ambiguity because 150 documents exceed the illustrative threshold of ten.

In this example, the query disambiguator module 170 may select a third clarifying question based on the keyword "credit card" and pose a question, "Are you collecting income with a credit card?" In this example, if the user answers "yes," then the query disambiguator module 170 is left with eight documents related to credit cards. In this example, the query disambiguator module 170 determines that the ambiguity has been removed because the number of documents is less than the illustrative threshold of ten. Furthermore, in this example, if there had been an illustrative budget of three clarifying questions, then the query disambiguator has reached a solution within the illustrative budget of three clarifying questions. In this example, if a fourth clarifying question needed to be posed, then the query disambiguator module may determine that four clarifying questions exceed the illustrative budget of three, and may accordingly inform the user to call a support person for additional assistance.

The response model 180 is a machine learning model that is utilized to determine the next clarifying question to pose to the user. A machine learning model may be trained utilizing supervised learning methodologies (e.g., classification and/or regression), unsupervised learning methodologies (e.g., clustering and/or association), semi-supervised learning methodologies (e.g., supervised and unsupervised), and other learning methodologies.

A budget is defined that limits the number of clarifying questions to be posed to a user for an ambiguous query. The response model 180 utilizes an algorithm that can determine the fewest number of clarifying questions within a defined budget of clarifying questions. The response model 180 reduces ambiguity by determining clarifying questions, the response to which reduces the number of feasible documents of the document data 121. The response model 180 determines the intent of the user based on the user profile data 123 associated with the user. The response model 180 utilizes adaptive submodularity to solve the set covering problems related to query ambiguity. The response model 180 identifies the problem of identifying the optimal sequence of clarifying questions as an Adaptive Stochastic Maximization Problem with Cardinality Constraints (ASMC). The response model 180 is utilized by an adaptive greedy algorithm to generate solutions that have an efficient optimality gap.

Exemplary Process

Figure 2:
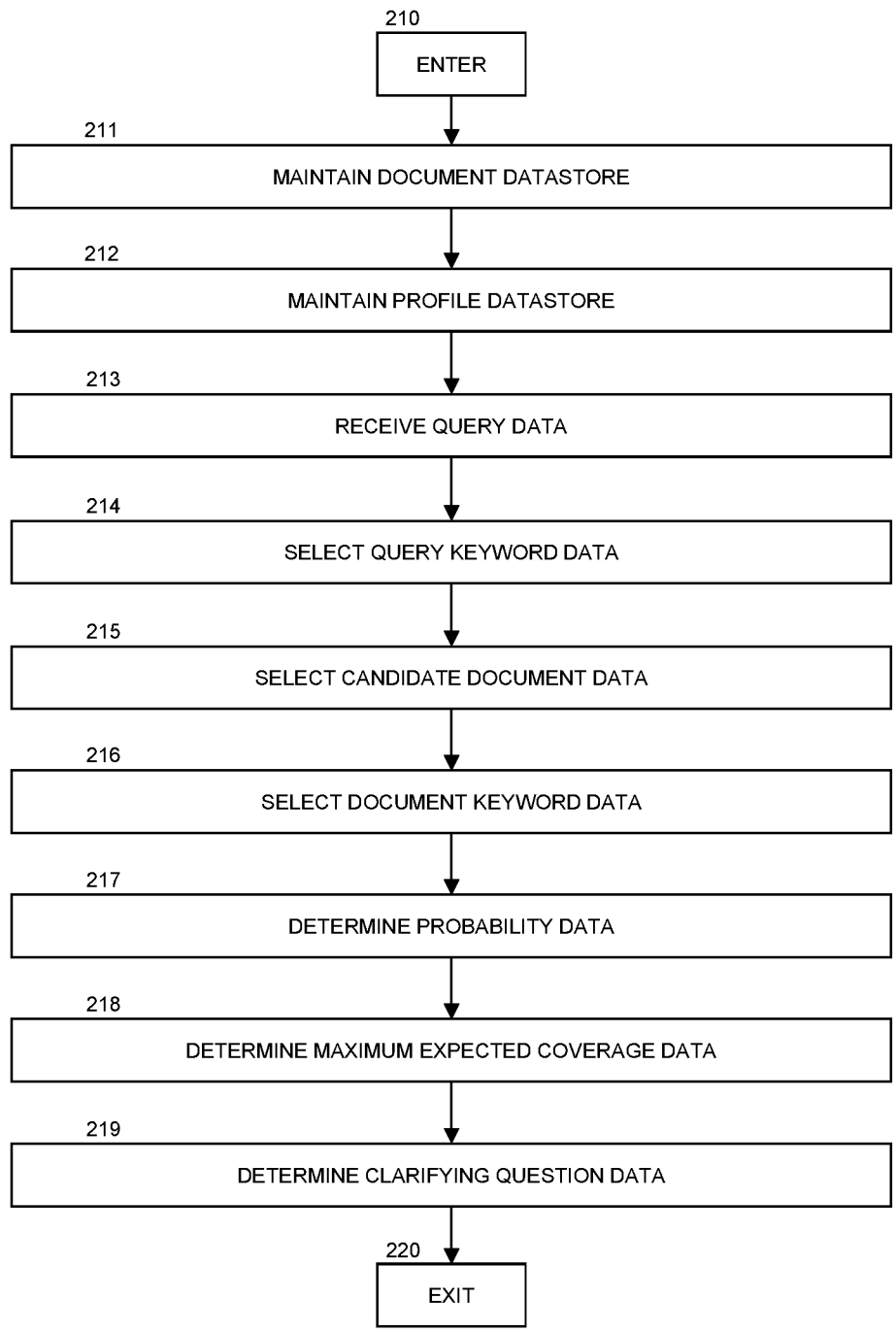
FIG. 2 is a flow diagram of a process for reduction of query ambiguity.

FIG. 2 is a flow diagram of a process 200 for reduction of query ambiguity. Referring to FIG. 2, the process 200 for reduction of query ambiguity begins at operation 210 and process flow proceeds to operation 211.

At operation 211, a document datastore is maintained by a data management system. The document datastore includes document data representing a plurality of documents. The plurality of documents are informational articles for users of the data management system. The articles include article titles that summarize the content of the articles. The plurality of documents is stored in a knowledgebase. A user query relates to at least one of the informational articles. For example, a document may have a title "Reimbursing out-of-state employees for travel expenses."

Once the document datastore is maintained at operation 211, process flow proceeds to operation 212.

At operation 212, a profile datastore is maintained by a data management system. The profile datastore includes profile data representing a profile of a user of the data management system. The profile data includes profile information for a plurality of users of the data management system. For example, a user profile may indicate that the user is a manufacturing business with sales employees located in various states.

Once the profile datastore is maintained at operation 212, process flow proceeds to operation 213.

At operation 213, query data is received from a user system of a user of a data management system. The query data is received from the user system via a chatbot module. A determination is made as to whether a user query represented by the query data is ambiguous. A user query is ambiguous if the reply to the user query results in a number of documents being returned to the user system that exceeds a threshold value. Query data represents a user query about the data management system. A reply to a user query is one or more documents stored at the knowledgebase of the data management system, in which the documents provide information to the user that the user seeks. For example, a user query may be "How do I reimburse my employee?"

Once query data is received at operation 213, process flow proceeds to operation 214.

At operation 214, query keyword data is selected from the query data. A user query is parsed into one or more query keywords. For example, if a user query is "How do I reimburse my employee?" then a first query keyword may be "reimburse" and a second query keyword may be "employee."

Once query keyword data is selected at operation 214, process flow proceeds to operation 215.

At operation 215, candidate document data is selected that represents a plurality of candidate documents. The candidate document data is selected based on the query keyword data. Each of the plurality of candidate documents includes a reference to at least one of the keywords. For example, if two of the query keywords are "reimburse" and "employee," then a candidate document may be titled "Reimbursing out-of-state employees for travel expenses," which relates to both query keywords. Documents of the knowledgebase that do not relate to any of the query keywords are not selected.

Once candidate document data is selected at operation 215, process flow proceeds to operation 216.

At operation 216, document keyword data is selected that represents a plurality of document keywords based on the plurality of candidate documents. Each of the plurality of documents have associated document keywords, as discussed further below with respect to FIG. 6. A plurality of documents shares common document keywords. A document keyword is utilized as an index to a plurality of associated documents. The selected document keywords do not include the query keywords. A query keyword is not a member of a plurality of document keywords. For example, if a document has a title of "Reimbursing out-of-state employees for travel expenses," then the document key words may be "out-of-state" and "travel."

Once document keyword data is selected at operation 216, process flow proceeds to operation 217.

At operation 217, probability data is determined that represents a plurality of probability values based on the plurality of document keywords and the profile of the user, as discussed further below with respect to FIG. 5. A probability value represents a probability of a user's answer to a clarifying question, in which the clarifying question is constructed from a document keyword. The probability of a user's answer is based on the profile information, in which the profile information relates to the document keyword. The plurality of probability values is based on a positive instance and a negative instance of each document keyword of the plurality of document keywords. For example, a document keyword may be "out-of-state." In this example, the user is an employer of both in-state and out-of-state employees. In this example, if the user is asked whether a user query is about out-of-state employees, then based on the profile information indicating that the user has both in-state and out-of-state employees, it is equally likely that the user will answer "yes" or "no." In contrast, in this example, if the profile information indicates that the user employs local employees only, and the user is asked whether the query is about out-of-state employees, then it is probable that the user would answer "no."

Once probability data is determined at operation 217, process flow proceeds to operation 218.

At operation 218, maximum expected coverage data is determined that represents a plurality of maximum expected coverage values based on the plurality of probability values. An expected coverage value represents a probability value in relation to the number of documents related to the probability value. For example, if a user is asked whether a user query is about out-of-state employees, and the user's answer is "yes," then documents about in-state employees are removed from the plurality of candidate documents. Such removed documents are covered, and the remaining documents are uncovered. The maximum expected coverage data indicates which keyword is likely to cover the largest number of documents based on either a positive or a negative answer.

Once maximum expected coverage data is determined at operation 218, process flow proceeds to operation 219.

At operation 219, clarifying question data is determined that represents a series of clarifying questions based on the plurality of maximum expected coverage values. A clarifying question is related to at least one document keyword. A clarifying question is determined based on uncovered documents from a plurality of candidate documents. A clarifying question is determined that has the highest maximum expected coverage. After that clarifying question is removed from a set of candidate clarifying questions, a next clarifying question is determined based on the highest maximum expected coverage not including the earlier clarifying question. For example, if a user query is "How do I reimburse my employee?" then the document keyword with the maximum expected coverage may be "out-of-state." In this example, a first clarifying question may be "Is your employee out-of-state?" In this example, based on the coverage of candidate documents of this first clarifying question, the next document keyword with the next maximum expected coverage may be "travel." In this example, a second clarifying question in the series of clarifying questions may be "Do you want to reimburse for travel expenses?"

The number of clarifying questions that are posed to a user is limited by a budget value that prevents too many questions being posed to the user. A budget value is determined based on a balance of time and quality. It is to be understood that it is desirable to reduce the processor time required to calculate a series of clarifying questions, however a favorable decrease in time may cause an unfavorable decrease in quality. It is also to be understood that it is desirable to increase the quality of the series of clarifying questions to have the smallest number of clarifying questions and the fewest number of valid documents to return to the user, however a favorable increase in quality may cause an unfavorable increase in time. A budget value is manually selectable based on human knowledge and analysis. Alternatively, a budget value is determined by the system based, for example, on the quantity of candidate documents, such as a smaller budget value for a smaller number of candidate documents and a larger budget value for a larger number of candidate documents.

The series of clarifying questions is determined based on a corresponding series of answers from the user system. The series of answers correspond to the series of clarifying questions. Each answer of the series of answers corresponds to a respective one of the series of clarifying questions.

The series of clarifying questions is delivered to a user system via a chatbot module. A series of answers to the series of questions is received from the user system via the chatbot module. A plurality of solution documents is selected based on the series of answers. The plurality of solution documents is chosen from the remaining plurality of candidate documents that are uncovered. The number of solution documents does not exceed a threshold value. The number of solution documents is limited to a threshold value. The plurality of solution documents is delivered to the user system via a chatbot module. For example, if a user query is "How do I reimburse my employee?" then after posing clarifying questions about out-of-state employees and travel expenses, a document title "Reimbursing out-of-state employees for travel expenses" may be delivered to the user system.

Once clarifying question data is determined at operation 219, process flow proceeds to operation 220.

At operation 220, the process 200 for reduction of query ambiguity is exited.

Exemplary Environment

Figure 3:
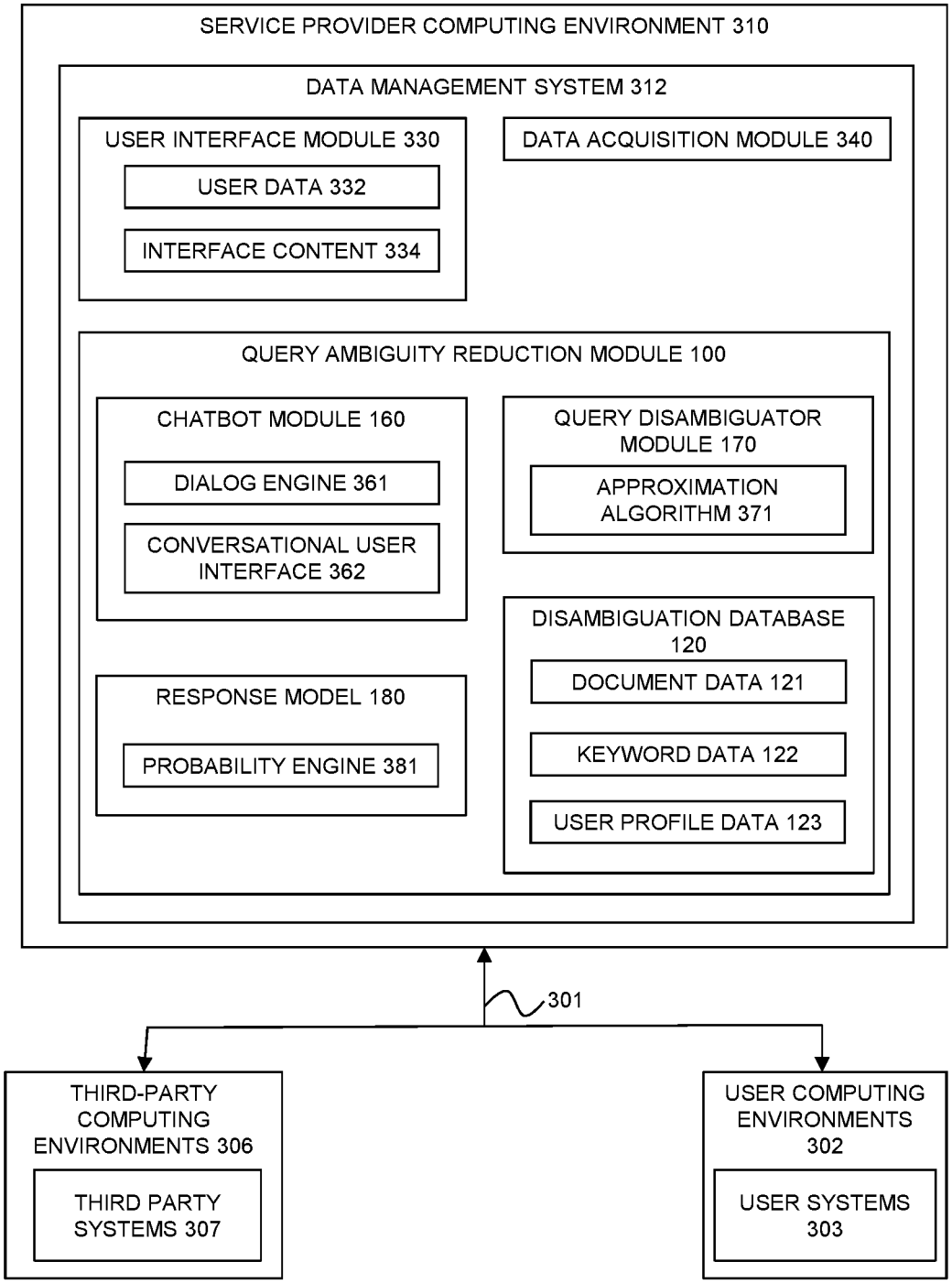
FIG. 3 is a functional block diagram of a production environment for reduction of query ambiguity.

FIG. 3 is a functional block diagram of a production environment 300 for reduction of query ambiguity. It is to be understood that the diagram of FIG. 3 is for exemplary purposes and is not meant to be limiting. For example, the data management system 312 may apply to any manner of transactions, such as social media posting transaction management, financial transaction management, real estate transaction management, governmental electronic governance transaction management, and any other data management system. A transaction can include, but is not limited to, any operation through which ownership or control of any item or right is transferred from one party to another party. For example of a transaction is a financial transaction.

Referring to FIGS. 1 and 3 together, the production environment 300 includes a service provider computing environment 310, user computing environments 302, and third-party computing environments 306. The computing environments 310, 302, and 306 are communicatively coupled to each other with one or more communication channels 301. The communication channels 301 may include one or more physical or virtual networks.

The service provider computing environment 310 includes the data management system 312, which is configured to provide transaction management services to a plurality of users. The data management system 312 is an electronic financial accounting system that assists users in bookkeeping or other financial accounting practices. Additionally, or alternatively, the data management system 312 can manage one or more of tax return preparation, banking, investments, loans, credit cards, real estate investments, retirement planning, bill pay, budgeting, and any other data management system. The data management system 312 can be a standalone system that provides transaction management services to users. Alternatively, the data management system 312 can be integrated into other software or service products provided by a service provider.

The data management system 312 can assist users in tracking expenditures and revenues by retrieving transaction data related to transactions of users. The data management system 312 may include a data acquisition module 340, a user interface module 330, and a query ambiguity reduction module 100.

The user computing environments 302 correspond to computing environments of the various users of the data management system 312. The user computing environments 302 may include user systems 303. The users of the data management system 312 utilize the user computing environments 302 to interact with the data management system 312. The users of the data management system 312 can use the user computing environments 302 to provide data to the data management system 312 and to receive data, including transaction management services, from the data management system 312.

The user interface module 330 of the data management system 312 is configured to receive user data 332 from the users. The user data 332 may be derived from information, such as, but not limited to, a user's name, personally identifiable information related to the user, authentication data that enables the user to access the data management system 312, or any other types of data that a user may provide in working with the data management system 312.

The user interface module 330 provides interface content 334 to the user computing environments 302. The interface content 334 can include data enabling a user to obtain the current status of the user's accounts. For example, the interface content 334 can enable the user to select among the user's accounts in order to view transactions associated with the user's accounts. The interface content 334 can enable a user to view the overall state of many accounts. The interface content 334 can also enable a user to select among the various options in the data management system 312 in order to fully utilize the services of the data management system 312.

The data acquisition module 340 of the data management system 312 is configured to receive from the third-party computing environments 306 data associated with the user.

The data acquisition module 340 is configured to use the third-party authentication data provided in the user data 332 to acquire transaction data related to transactions of the users from the third-party systems 307 of the third-party computing environments 306. In addition, the data acquisition module 340 may use the third-party authentication data to log into the online services of third-party computing environments 306 of third-party institutions in order to retrieve transaction data related to the transactions of users of the data management system 312. The data acquisition module 340 accesses the third-party institutions by interfacing with the third-party computing environments 306.

The data management system 312 includes the query ambiguity reduction module 100. The query ambiguity reduction module 100 includes a chatbot module 160, a query disambiguator module 170, a response model 180, and a disambiguation database 120. The disambiguation database 120 includes document data 121, keyword data 122, and user profile data 123.

The chatbot module 160 includes a dialog engine 361 and a conversational user interface 362. The chatbot module 160 manages the primary flow of conversation with a user. It is to be understood that the chatbot module 160 may interface with a plurality of user systems 303. The chatbot module 160 interfaces directly with the user systems 303 via the conversational user interface 362 to receive and transmit conversational data. The chatbot module interfaces indirectly with the user systems 303 via the user interface module 330 of the data management system 312.

The chatbot module 160 includes a dialog engine 361 that enables a conversation with a user via conversational data. The dialog engine 361 is implemented through models, rules, and algorithms. The dialog engine 361 includes automatic speech recognition (ASR) utilized to convert user speech or voice conversational data to text and natural language understanding (NLU) to recognize the meaning of the text data for processing conversational data.

The conversational user interface 362 includes a messaging platform. The messaging platform provides for real-time conveyance of conversational data in the form of short messages. For example, a user may enter text in a text box and then press a send button. For further example, a user may speak an oral message via a microphone, telephone, or other audio source, in which the oral message is translated into text.

The operation of chatbots, such as the chatbot module 160, and other systems for allowing conversational data, such as voice and text data, to be used to interface with one or more user systems 303, are well known in the art. It is to be understood that, although the chatbot system 160 is illustrated in FIG. 3 as being integrated with the query ambiguity reduction module 100, the chatbot system 160 may be its own separate system, is integrated into other systems, and includes any other system integration.

The query disambiguator module 170 includes an approximation algorithm 371. The query disambiguator module 170 interfaces with the document data 121 and the keyword data 122. The document data 121 represents a knowledgebase that contains documents. A document is comprised of keywords which are represented by the keyword data 122. The keyword data 122 is utilized to group the document data 121 into keyword groupings.

The query disambiguator module 170 receives a user query from the chatbot module 160. The chatbot module 160 determines that a user query is ambiguous. The query disambiguator module 170 determines that a user query is ambiguous. A user query is ambiguous when the reply to a query includes a number of documents of the document data 121 that exceeds a threshold value. When a user query is determined to be ambiguous, the query disambiguator module 170 determines a series of clarifying questions, and returns the clarifying questions to the chatbot module 160 to be posed to the user.

As the user's responses are received, the number of possible documents is reduced to a set of valid documents. The set of valid documents are answers to the user's query. The final set of valid documents is a number that falls below a threshold, such as two documents that will be returned to a user, or any threshold document number. A budget of clarifying questions is determined, such as a budget of five clarifying questions, or any budget value.

If the query disambiguator module 170 determines that the ambiguity of a user's query has been reduced below a defined threshold value, and the valid document set is not empty, then the chatbot module 160 provides the user with a list of valid documents. If the valid document set is empty, the chatbot module 160 provides the user with a message that the clarification has failed. For example, a message from the chatbot module 160 may be "I can't solve your problem, so please contact our call center for help on your query."

The approximation algorithm 371 of the query disambiguator module 170 determines an optimal series of clarifying questions to pose to a user of an ambiguous query. The approximation algorithm 371 determines an efficient path of determining a reply to the user, in which the efficient path fits within a budget. A budget is determined based on a balance of time and quality. It is to be understood that it is desirable to reduce the processor time required to calculate a series of clarifying questions, however a favorable decrease in time may cause an unfavorable decrease in quality. It is also to be understood that it is desirable to increase the quality of the series of clarifying questions to have the smallest number of clarifying questions and the fewest number of valid documents to return to the user, however a favorable increase in quality may cause an unfavorable increase in time.

There is an optimal number of clarifying questions represented as n-optimal, and there is an approximate number of clarifying questions represented as n-approximate. The difference between n-optimal and n-approximate is an optimality gap. It is desirable to reduce the optimality gap based on a balance of time and quality. For example, n-optimal may be ten clarifying questions, while n-approximate may be twelve clarifying questions, resulting in an optimality gap of two. The approximation algorithm 371 results in a reduced optimality gap.

A threshold is determined based on practical usefulness. For example, if an optimal solution involves ten clarifying questions, an approximate solution of up to twenty clarifying questions may be acceptable, but an approximate solution of up to thirty clarifying questions may not be acceptable. The approximation algorithm 371 addresses an adaptive submodular problem.

The query disambiguator module 170 interacts with the response model 180. The response model 180 calculates probabilities of user answers to possible clarifying questions. The response model 180 includes a probability engine 381 that calculates probabilities, as discussed further below. The response model 180 interacts with the user profile data 123 to determine appropriate probabilities.

FIG. 4 is an example 400 of a conversational user interface display 440 for reduction of query ambiguity. Referring to FIGS. 3 and 4 together, the conversational user interface display 440 illustrates a conversation between a chatbot module 160 and a user system 303. The conversational user interface display 440 illustrates inputs and outputs of the conversational user interface 362.

The conversational user interface display 440 includes a chatbot statement 441 of, "Hi, I am your assistant. How can I help?" The user requests a conversation with the chatbot, such as through clicking a "get help" button and other help mechanisms.

The conversational user interface display 440 includes a user statement 442 of "How do I accept payments from my customers?" For example, the user statement 442 is a user query. The user query is determined to be an ambiguous query. An ambiguous query is a query in which the number of applicable documents that would be returned to the user would exceed a threshold value. The documents to be returned are contained in a knowledgebase. The documents are articles written by subject matter experts. The documents have a content body and a title that summarizes the content body. A list of candidate documents that relate to the user query is determined. As illustrated in table 410 at column 411, there are ten candidate documents, represented as document titles, that relate to the user query of the user statement 442. It is to be understood that any number of candidate documents may relate to a user's ambiguous query.

For example of table 410, row 421 of column 411 illustrates a document title of "Receive money through offline direct deposit," row 422 of column 411 illustrates a document title of "Receiving a cash payment & recording it in the system," row 423 of column 411 illustrates a document title of "How to receive check payments from your customers," row 424 of column 411 illustrates a document title of "Accepting online payments from customers using foreign currency," row 425 of column 411 illustrates a document title of "Easy way to integrate mobile payments for domestic transactions," row 426 of column 411 illustrates a document title of "Accepting payments on mobile through ABC Online Payment Service," row 427 of column 411 illustrates a document title of "Receiving foreign payments through DEF Online Payment Service," row 428 of column 411 illustrates a document title of "Accept domestic payments with GHI Online Payment Service," row 429 of column 411 illustrates a document title of "How to receive money on mobile through JKL Online Payment Service," and row 430 of column 411 illustrates a document title of "Integrate online payments into your product for local payments."

For example, the document titles of column 411 relate to the user's query because they relate to payments. For example, the threshold number of applicable documents that can be returned is two. In this example, ten documents are too many because the user has to peruse the ten documents to find the solution to the user's query, which in this example may be considered too onerous for the user, compared to perusing two documents. It is to be understood that any threshold number can be selected, including selecting a threshold number specific to a user, such as a threshold number based on user profile data and user history data. For example, user profile data and user history data can be utilized to determine a user's likely preference for a threshold number.

The conversational user interface display 440 includes a chatbot statement 443 of, "Okay. Are they online payments or offline payments?" In this example, the chatbot statement 443 is a first chatbot clarifying question to the user. Keywords of the document titles are examined, and probabilities are calculated based on the user's profile. In this example, the first keyword with the maximum likelihood of coverage may be "online payments." A plurality of keywords is extracted from the current set of applicable document titles. For each keyword, a probability is calculated based on the user's profile information, in that the likely answer to the clarifying question will cover the largest number of documents.

It is to be understood that a keyword may include a single word, multiple words, phrases, and other keywords. Each keyword is used as an index to a plurality of documents related to the keyword. A keyword is determined to be important to a domain. For example, the keyword "wire transfer" may be important within an accounting domain. In this example, the keyword "wire transfer" may be related to a plurality of documents that discuss wire transfers from an accounting perspective.

It is to be understood that a document may have more than one keyword associated with it. For example, a document that explains wire transfers of funds in a foreign currency from a country with currency regulations may be related to three keywords of "wire transfer," "foreign currency," and "regulation." In this example, if a user indicates that the user's query is not related to foreign currency, then this document is removed as a candidate document of interest to the user, regardless of the user's interest in foreign currency or regulation. In this example, the removed document is covered.

The first question is derived from the keyword with the highest expected coverage. In this example, the keyword of "online payments" relates to seven documents represented at rows 424, 425, 426, 427, 428, 429, and 430, and the keyword of "offline payments" relates to three documents at rows 421, 422, and 423.

The conversational user interface display 440 includes a user statement 444 of "Online payments." For example, the user statement 444 is a first user answer in response to the first chatbot clarifying question. Because the user chose "online payments," rows 421, 422, and 423 are removed from the candidate documents, leaving seven documents represented at rows 424, 425, 426, 427, 428, 429, and 430. In this example, seven documents exceed the threshold of two, which indicates ambiguity.

The conversational user interface display 440 includes a chatbot statement 445 of, "Sure. Is it for mobile payments or web payments?" In this example, the chatbot statement 445 is a second chatbot clarifying question to the user. In this example, the second keyword with the maximum likelihood of coverage is "web payments." In this example, the keyword of "web payments" relates to four documents represented at rows 424, 427, 428, and 430, and the keyword of "mobile payments" relates to three documents at rows 425, 426, and 429. The keyword is used to derive a clarifying question. The clarifying question is derived to use colloquial language. The clarifying question is derived to provide two choices for an answer. In this example, the two choices are "mobile payments" and "web payments."

The probabilities are calculated based on a user profile indicating the likelihood of a user choosing either of the two choices. For example, a keyword may be "euros," and a corresponding clarifying question may be "Do you want to get paid in euros?" In this example, the answer is either "yes" or "no." In this example, a response model determines a probability about whether the user will answer in the positive and a probability about whether the user will answer in the negative. The response model calculates the probabilities for all of the keywords related to the current set of documents, and that have not already been identified either in the user's query or prior clarifying questions. The probabilities of answers are calculated for all of the valid possible clarifying questions.

When a user provides one of two choices, the documents related to that choice are covered, and the documents related to the remaining documents of the other choice remain as possible documents. It is to be understood that such coverage occurs regardless of whether the choice is a positive (e.g., yes) or a negative (e.g., no) answer. The probability of each choice is calculated based on the user's profile, past interaction with the data management system, historical transactions, and other user information. The keyword that has the highest probability of covering the most documents based on both a positive and a negative answer is chosen for the next clarifying question. The next clarifying question is determined based on it providing the highest expected coverage compared to other clarifying questions.

The conversational user interface display 440 includes a user statement 446 of "Web payments." For example, the user statement 446 is a second user answer in response to the second chatbot clarifying question. Because the user chose "web payments," rows 425, 426, and 429 are removed from the possible questions, leaving four documents represented at rows 424, 427, 428, and 430. In this example, four documents exceed the threshold of two, which indicates ambiguity.

The conversational user interface display 440 includes a chatbot statement 447 of "Got it. Is this for domestic only or international?" For example, the chatbot statement 447 is a third chatbot clarifying question to the user. In this example, the third keyword with the maximum likelihood of coverage is "international." In this example, the keyword of "international" relates to two documents represented at rows 424 and 427, and the keyword of "domestic only" relates to two documents at rows 428 and 430.

The conversational user interface display 440 includes a user statement 448 of "International." In this example, the user statement 448 is a third user answer in response to the third chatbot clarifying question. Because the user chose "international," rows 428 and 430 are removed from the possible questions, leaving two documents represented at rows 424 and 427. In this example, two documents do not exceed the threshold of two, which indicates a reduction in the ambiguity of the user's query.

The conversational user interface display 440 includes a chatbot statement 449 of, "Here are 2 links to documents that will help you: Accepting online payments from customers using foreign currency. Receiving foreign payments through DEF Online Payment Service." In this example, the chatbot statement 449 is a chatbot reply to the user's query of the user statement 442. In this example, the chatbot reply complies with the defined threshold of two documents.

The threshold is a practical constraint. For example, ten document titles may fit within a vertical listing on a typical computer display screen, and thus a threshold of ten would be appropriate because the user can view all ten document titles at the same time. As another example, a threshold may be based on the ease with which a user can scan a listing of document titles and retain the information in short-term memory to choose the preferred document to peruse. In this example, a threshold of three may be appropriate. As another example, a threshold may be based on the importance of providing a single document. In this example, it may be advantageous in a medical domain for a user to receive a single document, and thus a threshold of one would be appropriate. As another example, a threshold may be determined for each user based on the respective user profile of the user. It is to be understood that any value of threshold may be determined.

FIG. 5 is an example 500 of maximum expected coverage for reduction of query ambiguity. Referring to FIGS. 3 and 5 together, the table 510 illustrates various aspects of the query disambiguator module 170. The table 510 illustrates various aspects of the response model 180 that is utilized by the query disambiguator module 170. The table 510 illustrates various aspects of the probability engine 381 of the response model 180.

The table 510 includes the row 521 that represents a label for a first possible question and the row 525 that represents a label for a second possible question. The column 511 illustrates probabilities of an answer being yes or no, as determined by the response model 180 utilizing the user profile data 123, the column 512 illustrates the number of documents of the document data 121 that are covered by the respective answer, and the column 513 illustrates the expected coverage for the answer. Probabilities are calculated by the probability engine 381 of the response model 180. The response model 180 is making a guess of an outcome based on information of a user profile.

At row 522 of column 511, the probability that the answer to the first possible question is "yes" is 0.0001, which at row 522 of column 512 covers 3989 documents. At row 522 of column 513, the expected coverage is illustrated as 0.3989, which is 0.0001 times 3989. At row 523 of column 511, the probability that the answer to the first possible question is "no" is 0.9999, which at row 523 of column 512 covers 11 documents. At row 523 of column 513, the expected coverage is illustrated as 10.9989, which is 0.9999 times 11. At row 524 of column 511, the summation of the probabilities is 1.0, at row 524 of column 512, the summation of the candidate documents that can be covered is 4000, and at row 524 of column 513, the summation of the expected coverages is 11.3978 for the first possible question.

At row 526 of column 511, the probability that the answer to the second possible question is "yes" is 0.49, which at row 526 of column 512 covers 1000 documents. At row 526 of column 513, the expected coverage is illustrated as 490, which is 0.49 times 1000. At row 527 of column 511, the probability that the answer to the second possible question is "no" is 0.51, which at row 527 of column 512 covers 3000 documents. At row 527 of column 513, the expected coverage is illustrated as 1530, which is 0.51 times 3000. At row 528 of column 511, the summation of the probabilities is 1.0, at row 528 of column 512, the summation of the candidate documents that can be covered is 4000, and at row 528 of column 513, the summation of the expected coverages is 2020 for the second possible question.

As can be seen in the example illustrated by the table 510, the summed expected coverage of the first possible question is 11.3978, which is less than the summed expected coverage of the second possible question of 2020, thus the maximum expected coverage between the first possible question and the second possible question is the second possible question. Accordingly, in this example, when given a choice between the first possible question and the second possible question, the second possible question would be selected to be posed to the user to clarify the user's query.

A submodularity of coverage problem is modeled as an Adaptive Stochastic Maximization Problem with Cardinality Constraints (ASMC). With ASMC, it is shown that the expected information gain to be optimized is adaptive submodular with respect to clarifying questions. A user's answers to clarifying questions are not known when the user asks a query via a chatbot. A user's answers are observed after a question is posed to the user. Thus, the expected information gain is optimized assuming an a-priori distribution over the user's answers to clarifying questions.

The lemma of monotonicity of the harmonic mean is utilized, which is stated as the following: Let $a_1$, $a_2$, $\epsilon_1$, $\epsilon_2 \in Z_{\geq 0}$. Let $b_1 = a_1 + \epsilon_1$ etc. Then $$\frac{2a_1 a_2}{a_1 + a_2} \leq \frac{2b_1 b_2}{b_1 + b_2}.$$

$$\text{Proof } \frac{1}{a_1} \geq \frac{1}{b_1} \text{etc.}$$

Hence $$\frac{2a_1 a_2}{a_1 + a_2} \leq \frac{2b_1 b_2}{b_1 + b_2}.$$

A response module is utilized. A machine learning model provides the probability of a particular answer to a question q conditioned on the set of answers already observed $p(q=\text{"Yes"}|A_k)$ where $A_k$ is the set of answers for the first k questions for a k.

An expected marginal coverage is utilized. The expected number of the incremental number of documents that are covered is based on an answer to a question q given that answers for k questions that correspond to the set $Q_k$ that have been received is $\Delta(q|Q_k)$, which represents the expected marginal coverage. It is to be understood that such an expected marginal coverage is over the distribution over Yes and No for the question, given by the response model. It is to be further understood that a document that is covered is rendered infeasible.

The theorem of adaptive submodularity of coverage is utilized. Given the response model, the expected marginal coverage is adaptive-submodular in the set of questions already asked. Such is shown by assuming that k clarifying questions have been already asked and their answers received. Let $U(Q_k)$ be the set of documents that are still left uncovered after asking $Q_K$. A specific question q is being considered to be posed. Based on the user's answer to q, the set $U(Q_k)$ is split into two sets, depending on whether the answer is Yes or No. Let $n_{Y,k}$ and $n_{N,k}$ be the number of documents in the set that is valid according to either a Yes answer and a No answer, depending on whether the documents contain the respective keyword corresponding to question q. The expected marginal coverage is $$\Delta(q|Q_k) = \frac{2n_{Y,k} n_{N,k}}{n_{Y,k} + n_{N,k}}.$$

There is a situation in which a set of questions $Q_{k+1}$ has been posed such that $Q_k \subseteq Q_{k+1}$ and $q \notin Q_{k+1}$. The expected marginal coverage in such a case is $$\Delta(q|Q_{k+1}) = \frac{2n_{Y,k+1} n_{N,k+1}}{n_{Y,k+1} + n_{N,k+1}}.$$

It is to be understood that $n_{Y,k+1} \leq n_{Y,k}$ etc. is acceptable because posing additional questions reduces the valid and feasible set of questions, which, in conjunction with the lemma of monotonicity of the harmonic mean, implies $\Delta(q|Q_{k+1}) \leq \Delta(q|Q_k)$ FIG. 6 is an example 600 of an algorithm 610 for reduction of query ambiguity. Referring to FIGS. 3 and 6 together, the algorithm 610 illustrates various aspects of the approximation algorithm 371. The algorithm 610 is illustrated as a table with the column 611.

At row 621 of column 611, an input is illustrated of "INPUT: Budget L, Set of possible questions E, Response Model R, Sequence of answers A." The algorithm 610 receives as input a budget represented as L in the algorithm 610. The budget is a limit to the number of clarifying questions that can be posed to a user. A budget identifies a number of clarifying questions allowed to be posed to a user for a given ambiguous query of the user. A budget is determined based on the quantity of candidate documents, such as a smaller budget for a smaller number of candidate documents and a larger budget for a larger number of candidate documents.

The budget is a number of clarifying questions that can be posed to a user before a typical user abandons seeking a reply of information to a query. A user will abandon seeking a reply of information to a query when there are too many clarifying questions being posed to the user. The number of clarifying questions that are posed to a user is two, three, four, five and any other limited number. The budget is defined based on a practical constraint that a user does not have the time to answer many clarifying questions.

The algorithm 610 receives as input a set of possible questions represented as E. The data management system includes a help center that comprises information that users have historically sought about the data management system. Such information is stored within a knowledgebase. A knowledgebase comprises articles that have been written about various topics. An article comprises a title that summarizes the text of the article. Keywords are extracted from the titles of the articles. The keywords are utilized to define possible clarifying questions.

For example, an article in a knowledgebase may have a title of "Can I accept a non-US credit card from my customer using merchant services?" In this example, a keyword may be extracted from the title such as "non-US credit card." It is to be understood that a keyword is not limited to a single word, and may be a plurality of words, a phrase, and other keywords. In this example, the keyword of "non-US credit card" is utilized to generate a clarifying question to the user. In this example, if a user query is "I have a customer who is paying with a credit card that I don't recognize," then a clarifying question can be "Is it a non-US credit card?" In this example, if the user answers "yes," then the article may be of interest to the user, and if the user answers "no," then the article may not be of interest to the user.

The set of possible questions that are received as input are the questions that are determined to be related to a query of the user. A set of possible clarifying questions are derived from document keywords of candidate documents. For example, if a query of a user is "I have a customer who is paying with a credit card that I don't recognize," then all possible clarifying questions that are related to credit card articles is included in the set of possible questions.

The algorithm 610 receives as input a response model represented as R. The response model is based on probabilities derived from user profile data of the data management system. The response model determines a probability of a user's answer to a clarifying question. A clarifying question has two alternative answers, such as "yes" and "no,"

"domestic" and "international," or any other two alternative answers. The response model determines a probability that the user will respond with a first alternative answer and determines a probability that the user will respond with a second alternative answer.

For example, a user may have a query about how to accept payments from customers. In this example, one of the clarifying questions of the set of clarifying questions may be "Do you want to get paid in US dollars or do you want to get paid in foreign currency?" It is to be understood that until this question is answered by a user, the actual answer cannot be known because the answer is within the user's mind. Using machine learning, a response model can be built that can predict the probability of whether a user's answer is more likely to be a first answer, such as "US dollars," or is more likely to be a second answer, such as "foreign currency." Such a prediction is based on profile information about a user. Profile information includes demographic information, transaction history information, previous query information, and other profile information.

For example, profile information about a user may indicate that the user is based in India. In this example, the response model may determine that the user is unlikely to be paid in US dollars because such currency would be considered a foreign currency to the user. As another example, the same user may have an Indian information technology business with employees in the United States to service such clients, and the response model may determine that the user is likely to be paid in US dollars due to the user's clients being based in the United States. It is to be understood that, in this example, the prediction is an estimate of how a user will respond to a question based on profile information about the user. Such a prediction is represented by a number with a range from 0.0 to 1.0

For example, a possible clarifying question may be whether a user will be paid in US dollars or foreign currency. In this example, based on a user being located in India, the response model may predict that the probability that the user will respond with US dollars is 0.1, indicating a low probability. In this example, the response model may also predict that the probability that the user will respond with foreign currency is 0.9, indicating a high probability. As a modification to this example, if the Indian user is in the information technology industry, the response model may predict that the probability that the user will respond with US dollars is 0.3, and the response model may predict that the probability that the user will respond with foreign currency is 0.7.

The algorithm 610 receives as input a sequence of answers represented as A. The sequence of answers is a data structure. The sequence of answers stores the answers that will be provided by a user to posed clarifying questions. The sequence of answers is received from users.

At row 622 of column 611, an output is illustrated of "OUTPUT: Sequence of questions O=[$q_1 \ldots q_k$] for $q_i \in E$." The algorithm 610 returns as output a sequence of questions represented as O in the algorithm 610. The sequence of questions is a data structure. The sequence of questions stores the questions to be posed to a user. The sequence of questions is storage for questions in the sequence to be posed to users. The sequence of questions is a question with subscript 1 to a question with subscript k, where k represents the last question in the sequence. All the questions of the sequence of questions is a member of the set of possible questions represented as E. All the questions of the sequence of questions is represented by q subscript i, where i represents an index value.

At row 623 of column 611, a function is illustrated of "Function ArgmaxCoverage(E, R, A, O):" The algorithm 610 includes a function named ArgmaxCoverage. It is to be understood that a function could have any name. Referring to FIG. 5, the example table 510 illustrates that the function named ArgmaxCoverage would select the second possible question at row 525 because it has an expected coverage of 2020 that exceeds the first possible question at row 521 that has a lower expected coverage of 11.3978. It is to be understood that the function named ArgmaxCoverage is a coverage function.

Returning to FIG. 6, the function named ArgmaxCoverage receives arguments as inputs. The function named ArgmaxCoverage receives as input a set of possible questions represented as E, a response model represented as R, a sequence of answers represented as A, and a sequence of questions represented as O. The function named ArgmaxCoverage provides coverage of the set of possible questions represented as E. For example, if there are fifteen possible questions in the set of possible questions, then the function named ArgmaxCoverage may cover ten of those possible questions. Such coverage causes those ten possible questions to be removed from the set of possible questions, leaving five possible questions in the set of possible questions. The ten possible questions that are removed in this example are covered, and accordingly, no longer need to be considered for the respective user query.

The function named ArgmaxCoverage maximizes the expected coverage. The expected coverage addresses uncertainty of what would actually get covered based on actual answers of users. The expected coverage addresses expectations as determined by the response model. For example, the response model may indicate that a positive answer to a first question may have a low probability, such as 0.1, and may cover a small number of possible questions. In this example, the response model may also indicate that a positive answer to a second question may have higher probability, such as 0.5, and may cover a large number of possible questions. In this example, the second question provides more expected coverage. The function named ArgmaxCoverage returns the maximum expected coverage of the possible questions. The function ArgmaxCoverage covers the broadest number of possible questions.

The function named ArgmaxCoverage seeks the possible question which, after receiving a user answer, is likely to decrease the number of next possible questions that can be asked. It is to be understood that the number of possible questions that are covered is based not only on positive answers, such as "yes," but on negative answers as well, such as "no." It is to be understood that, although a positive answer may provide more coverage, a negative answer may provide some coverage as well, even though that coverage may be less. The function named ArgmaxCoverage takes into account coverage based on all possible answers to a question, including positive and negative answers to clarifying questions.

The sequence of answers represented as A represents all possible answers that the response model can utilize. The response model examines all possible answers that a user provides in response to possible questions. As information is gathered through posing questions to a user, the number of possible answers is reduced. The clarifying questions are derived from the valid answers. When an answer is covered, it is no longer valid because it has been discarded by previous questions. The sequence of answers represented as A are utilized to monitor how many questions have been discarded. The sequence of answers represented as A are utilized to derive the clarifying questions. A strong assumption is made that the answer lies within the set of all answers, and that it cannot be outside such a set.

At row 624 of column 611, the function named ArgmaxCoverage includes a return to the function of "return argmax $\Delta(q|Q_k)$ using R, A, E." Here, $\Delta(q|Q_k)$ is the expected number of incremental number of questions covered (i.e., made infeasible) based on an answer to a question represented as q given that responses for a number of questions have already been received. Such number of questions is represented as Q subscript k, where Q represents a set of questions and k represents an index value. Here, k is equivalent to a budget represented as L. The argument named argmax represents the question that provides the maximum expected coverage given the currently known information. Given a current state, such as given the arguments R, A, and E, the function named ArgmaxCoverage returns the best possible clarifying question to ask a user, which is determined by the expected coverage. Delta depicted as $\Delta$ represents the maximum expected coverage given previous questions. Delta represents that after every possible question is posed, that the coverage of the possible questions will increase. Delta represents subtracting the coverage of the current step from the coverage of a previous step.

At row 625 of column 611, the algorithm 610 includes a command of "O←Φ." The sequence of questions represented as O is initialized as an empty set. Such an empty set is represented by phi depicted as Φ.

At row 626 of column 611, the algorithm 610 includes an instruction of "for i←1 to L do." A for loop is defined that ends at row 631 of column 611. Here, i represents an index value. Here, L represents the budget of possible questions that will be posed to a user. The index value will be less than or equal to the budget of possible questions. For example, if the budget is four, then the for loop will be iterated up to four times, resulting in up to four possible questions being determined. The for loop utilizes the function named ArgmaxCoverage for each iteration of the for loop.

At row 627 of column 611, the for loop of the algorithm 610 includes an instruction of "Select e*=ArgmaxCoverage (E, R, A, O)." The clarifying question with the highest expected coverage is represented by e*. The function named ArgmaxCoverage selects the clarifying question with the highest expected coverage. The function named ArgmaxCoverage receives as arguments a set of possible questions represented as E, a response model represented as R, a sequence of answers represented as A, and a sequence of questions represented as O. The function named ArgmaxCoverage returns e* that represents the return of the function represented as argmax $\Delta(q|Q_k)$ using R, A, E. With each iteration of the for loop, the question with the highest expected coverage is selected.

At row 628 of column 611, the for loop of the algorithm 610 includes an instruction of "O←append(O, e*)." The selected clarifying question of the previous instruction, represented as e*, is appended to the sequence of questions represented as O. An append command includes as input the prior sequence of questions represented as O, and appends the selected clarifying question represented as e* to the end of the sequence, such that the sequence in the current iteration ends with the iteration's selected clarifying question. For example, if the current iteration is the first iteration of the for loop, then the sequence of questions represented as O is empty, and the selected clarifying question represented as e* becomes the first clarifying question of the sequence of questions.

At row 629 of column 611, the for loop of the algorithm 610 includes an instruction of "E←remove(E, e*)." The selected clarifying question appended to the sequence of questions of the previous instruction, represented as e*, is removed from the set of possible questions represented as E. Removing the selected clarifying question prevents a clarifying question from being posed to a user more than one time for each user query. The selected clarifying question is deleted from the set of possible questions represented as E. This ensures that if a clarifying question has already been posed to a user who provided an ambiguous query, then the clarifying question is not duplicated in the sequence of questions represented as O.

At row 630 of column 611, the for loop of the algorithm 610 includes an instruction of "A←append(A, userAnswer (e*))." The selected clarifying question represented as e* is posed to the user at the instruction represented as userAnswer. Referring to FIG. 3, the clarifying question is posed to the user and a user answer is received via the user system 303. Returning to FIG. 6, the instruction named userAnswer returns the user's answer to the clarifying question. The user's answer is appended to the sequence of answers represented as A. The user will provide one of a set of predefined answers, such as "yes" and "no."

The command named userAnswer is a function that takes an optimal clarifying question represented as e* as input and asks the clarifying question to the user. The command named userAnswer returns the user's answer. The user's answer is stored to the sequence of answers represented as A. The user's answer is appended to the end of the sequence of answers represented as A.

At row 631 of column 611, the for loop of the algorithm 610 includes an instruction of "end." This instruction ends the for loop of row 626 at column 611.

For each iteration of the for loop, the sequence of questions represented as O increases. The sequence of questions represented as O begins as an empty set, and a selected clarifying question is appended for each iteration of the for loop. For each iteration of the for loop, the set of possible questions represented as E decreases. The set of possible questions represented as E begins as a set of possible questions, and with each iteration of the for loop, a selected clarifying question is removed. For each iteration of the for loop, the sequence of answers represented as A increases. The sequence of answers increases as each answer received from the user in response to a posed clarifying question is appended to the sequence of answers with each iteration of the for loop. The algorithm 610 is a greedy algorithm that provides an optimality gap of 1−1/e, where e is Euler's constant.

The sequence of questions represented as O provides an optimal sequence of clarifying questions based on the information known about a user. The sequence of questions represented as O enables clarification of a user's intent regarding an ambiguous query of the user. The sequence of questions represented as O enables the user to clarify the user's intent with a number of questions that is equal to or less than a budget, so that the user does not become frustrated with too many clarifying questions.

Embodiments of the present disclosure provide highly efficient, effective, and versatile systems and methods for reduction of query ambiguity. However, the disclosed embodiments do not encompass, embody, or preclude other forms of innovation in the area of dialog systems and methods.

In addition, the disclosed embodiments of systems and methods for reduction of query ambiguity are not abstract ideas for at least several reasons.

First, the disclosed systems and methods for reduction of query ambiguity are not abstract ideas because they are not merely an idea itself (e.g., can be performed mentally or using pen and paper). For example, with a traditional data management system, users are offered a knowledgebase of articles for self-help. Because a knowledgebase can contain over a million articles with billions of key words and phrases, it is not feasible for a human to mentally track such articles and pick out the article that resolves the user's query.

In contrast, the disclosed embodiments utilize calculations of probabilities of user answers to chatbot clarifying questions based on the user's profile information, in order to select clarifying questions based on keywords of articles. Due to the complexity of such probability calculations for each applicable keyword based on a specific individual user's profile information, the human mind cannot construct an efficient series of clarifying questions even with the aid of pen and paper.

Second, the disclosed systems and methods for reduction of query ambiguity are not abstract ideas because they are not a fundamental economic practice (e.g., are not merely creating a contractual relationship, hedging, mitigating a settlement risk, etc.). In contrast, the disclosed embodiments provide for improving the ability of users to engage in self-help of a data management system. With a traditional data management system, unless a user provides a clear and historically common query, the user will typically spend an excessive amount of time searching for a document. The disclosed embodiments improve a user's ability to engage in self-help, which are not fundamental economic practices.

Third, the disclosed systems and methods for reduction of query ambiguity are not abstract ideas because they are not a method of organizing human activity (e.g., managing a game of bingo), but are rather, a mechanism to efficiently disseminate information from a knowledgebase. Under a traditional data management system, transcripts of historical queries are analyzed to determine the most popular queries, and users are guided to those popular queries without knowing the intent of a specific user. With a traditional data management system, if the user's intent of a query does not fit within a common query as indicated by historical queries, then the user engages in an arduous task of searching for information that will resolve the user's query. In contrast, the disclosed embodiments provide for determining a series of clarifying questions that are limited in number and customized to the specific user based on the user's profile information. Such does not organize the human activity of the user, but rather enables the user to expediently receive requested information that is relevant to the user.

Fourth, although mathematics may be used in the disclosed systems and methods for reduction of query ambiguity, the disclosed and claimed systems and methods are not abstract ideas because they are not simply a mathematical relationship/formula. In contrast, utilization of the disclosed embodiments results in the tangible effect of decreasing the time required for a user to receive requested information. Under a typical data management system, stochastic methodologies that are non-deterministic polynomial (NP)-complete are utilized, such as a brute force methodology that randomly explores the knowledgebase until an adequate document is eventually found.

In contrast, the disclosed embodiments model the problem as an Adaptive Stochastic Maximization Problem with Cardinality Constraints (ASMC) that enables the utilization of greedy approximation algorithms to provide a user with relevant information, based on the problem being adaptive submodular. Use of greedy approximation algorithms have the tangible effect of reducing processor workloads by selecting clarifying questions that efficiently remove documents that are unhelpful due to calculations of maximum expected coverage.

In addition, selecting clarifying questions that are optimally sequenced to reduce the number of clarifying questions being posed to users results in less processing resources being consumed, less memory utilization, and less data transfer bandwidth being used. Therefore, hardware and networking systems utilizing the disclosed embodiments operate more efficient and are transformed into more accurate and effective systems by implementing the disclosed embodiments. Consequently, the disclosed embodiments allow both human and non-human resources to be utilized more efficiently.

In the discussion above, certain aspects of some embodiments include process steps and/or operations and/or instructions described herein for illustrative purposes in a particular order and/or grouping. However, the particular order and/or grouping shown and discussed herein is illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein does not limit the scope of the invention as claimed below. Therefore, numerous variations, whether explicitly provided for by the specification or implied by the specification or not, may be implemented by one of skill in the art in view of this disclosure.

What is claimed is:

1. A method for clarifying a user query to a document datastore, the method comprising:
   receiving a user query from a user associated with the document datastore;
   extracting one or more keywords in the user query;
   identifying, from the document datastore, a first plurality of documents responsive to the user query based on the one or more keywords;
   determining a number of documents in the first plurality of documents;
   comparing the number of documents in the first plurality of documents to a threshold number of documents;
   in response to the number of documents in the first plurality of documents exceeding the threshold number of documents, selecting a first clarifying question from one or more potential clarifying questions, based at least in part on the first plurality of documents and on profile data of the user, the first clarifying question predicted to remove a largest number of documents from the first plurality of documents;
   presenting the user with the first clarifying question;
   receiving a user response to the first clarifying question;
   generating a second plurality of documents by removing a number of documents from the first plurality of documents based on the user response to the first clarifying question; and presenting the user with query results, the query results based at least in part on the second plurality of documents.

2. The method of claim 1, wherein selecting the first clarifying question comprises:
identifying the one or more potential clarifying questions, each clarifying question prompting an answer selected from a first choice and a second choice;
predicting, for each potential clarifying question of the one or more potential clarifying questions, a first likelihood that the user will answer with the first choice and a second likelihood that the user will answer with the second choice, wherein the prediction is based on the user's profile data;
determining, for each potential clarifying question of the one or more potential clarifying questions, a first number of documents to be removed from the first plurality of documents in response to the user selecting the first choice, and a second number of documents to be removed from the first plurality of documents in response to the user selecting the second choice; and
selecting the first clarifying question based at least in part on the first likelihood, the second likelihood, the first number of documents and the second number of documents.

3. The method of claim 2, wherein selecting the first clarifying question comprises:
determining, for each potential clarifying question of the one or more potential clarifying questions, a first product of the first likelihood and the first number of documents, and a second product of the second likelihood and the second number of documents; and
selecting the first clarifying question to be the potential clarifying question of the one or more clarifying questions having a largest sum of the first product and the second product.

4. The method of claim 2, wherein the first number of documents and the second number of documents correspond to respective pluralities of documents from the first plurality of documents whose relevance to the user query is precluded by the corresponding selection of the first choice and the second choice.

5. The method of claim 1, wherein the one or more potential clarifying questions correspond to the extracted one or more keywords in the user query.

6. The method of claim 1, wherein the extracted one or more keywords are associated with positive instances and negative instances of the one or more keywords among the documents of the document datastore.

7. The method of claim 1, wherein the user query and the user response are received via a chatbot module.

8. The method of claim 1, wherein the first clarifying question and the query results are presented to the user via a chatbot module.

9. The method of claim 1, further comprising:
selecting a second clarifying question based at least in part on the second plurality of documents and on profile data of the user, wherein selecting the second clarifying question comprises selecting the second clarifying question from the one or more potential clarifying questions, absent the first clarifying question, which is predicted to remove a largest number of documents from the second plurality of documents;
presenting the user with the second clarifying question;
receiving a user response to the second clarifying question; and
generating a third plurality of documents by removing a number of documents from the second plurality of documents based on the user response to the first clarifying question;
wherein the query results are further based at least in part on the third plurality of documents.

10. The method of claim 1, wherein additional clarifying questions are selected and presented to the user subject to a maximum number of allowed clarifying questions.

11. The method of claim 10, wherein, in response to the query results including less than a threshold number of responsive documents, no further clarifying questions are selected or presented to the user.

12. A system for clarifying a user query to a document datastore, the system comprising:
at least one processor;
at least one memory coupled to the at least one processor, the at least one memory storing instructions for execution by the at least one processor, wherein execution of the instructions by the at least one processor causes the system to perform operations comprising:
receiving a user query from a user associated with the document datastore;
extracting one or more keywords in the user query;
identifying, from the document datastore, a first plurality of documents responsive to the user query based on the one or more keywords;
determining a number of documents in the first plurality of documents;
comparing the number of documents in the first plurality of documents to a threshold number of documents;
in response to the number of documents in the first plurality of documents exceeding the threshold number of documents, selecting a first clarifying question from one or more potential clarifying questions, based at least in part on the first plurality of documents and on profile data of the user, the first clarifying question predicted to remove a largest number of documents from the first plurality of documents;
presenting the user with the first clarifying question;
receiving a user response to the first clarifying question;
generating a second plurality of documents by removing a number of documents from the first plurality of documents based on the user response to the first clarifying question; and
presenting the user with query results, the query results based at least in part on the second plurality of documents.

13. The system of claim 12, wherein execution of the instructions for selecting the first clarifying question causes the system to perform operations further comprising:
identifying the one or more potential clarifying questions, each clarifying question prompting an answer selected from a first choice and a second choice;
predicting, for each potential clarifying question of the one or more potential clarifying questions, a first likelihood that the user will answer with the first choice and a second likelihood that the user will answer with the second choice, wherein the prediction is based on the user's profile data;
determining, for each potential clarifying question of the one or more potential clarifying questions, a first number of documents to be removed from the first plurality of documents in response to the user selecting the first choice, and a second number of documents to be removed from the first plurality of documents in response to the user selecting the second choice; and
selecting the first clarifying question based at least in part on the first likelihood, the second likelihood, the first number of documents and the second number of documents.

14. The system of claim 13, wherein execution of the instructions for selecting the first clarifying question causes the system to perform operations further comprising:
determining, for each potential clarifying question of the one or more potential clarifying questions, a first product of the first likelihood and the first number of documents, and a second product of the second likelihood and the second number of documents; and
selecting the first clarifying question to be the potential clarifying question of the one or more clarifying questions having a largest sum of the first product and the second product.

15. The system of claim 13, wherein the first number of documents and the second number of documents correspond to respective pluralities of documents from the first plurality of documents whose relevance to the user query is precluded by the corresponding selection of the first choice and the second choice.

16. The system of claim 12, wherein the one or more potential clarifying questions correspond to the extracted one or more keywords in the user query.

17. The system of claim 12, wherein the extracted one or more keywords are associated with positive instances and negative instances of the one or more keywords among the documents of the document datastore.

18. The system of claim 12, wherein execution of the instructions causes the system to perform operations further comprising:
selecting a second clarifying question based at least in part on the second plurality of documents and on profile data of the user, wherein selecting the second clarifying question comprises selecting the second clarifying question from the one or more potential clarifying questions, absent the first clarifying question, which is predicted to remove a largest number of documents from the second plurality of documents;
presenting the user with the second clarifying question;
receiving a user response to the second clarifying question; and
generating a third plurality of documents by removing a number of documents from the second plurality of documents based on the user response to the first clarifying question;
wherein the query results are further based at least in part on the third plurality of documents.

19. The system of claim 12, wherein additional clarifying questions are selected and presented to the user subject to a maximum number of allowed clarifying questions.

20. The system of claim 18, wherein, in response to the query results including less than a threshold number of responsive documents, no further clarifying questions are selected or presented to the user.

* * * * *